United States Patent
Oyaide

(10) Patent No.: US 10,402,304 B2
(45) Date of Patent: Sep. 3, 2019

(54) NON-TRANSITORY COMPUTER-READABLE STORAGE MEDIUM, CORRECTION SUPPORT METHOD AND CORRECTION SUPPORT DEVICE

(71) Applicant: FUJITSU LIMITED, Kawasaki-shi, Kanagawa (JP)

(72) Inventor: Mari Oyaide, Shimizu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/817,378

(22) Filed: Nov. 20, 2017

(65) Prior Publication Data
US 2018/0143893 A1 May 24, 2018

(30) Foreign Application Priority Data
Nov. 22, 2016 (JP) ................ 2016-227326

(51) Int. Cl.
*G06F 11/36* (2006.01)
*G06F 8/41* (2018.01)
(Continued)

(52) U.S. Cl.
CPC ........... *G06F 11/3624* (2013.01); *G06F 8/41* (2013.01); *G06F 8/42* (2013.01); *G06F 8/43* (2013.01);
(Continued)

(58) Field of Classification Search
CPC ... G06F 8/30–8/34; G06F 8/40–8/4443; G06F 8/51; G06F 11/079; G06F 11/3624; G06F 11/3628; G06F 11/3664–11/3696
(Continued)

(56) References Cited

U.S. PATENT DOCUMENTS

| 5,170,465 | A | 12/1992 | McKeeman et al. |
| 6,748,582 | B1 * | 6/2004 | Chiles ........... G06F 8/30 717/101 |

(Continued)

FOREIGN PATENT DOCUMENTS

| JP | 1-307832 | 12/1989 |
| JP | 3-118635 | 5/1991 |

(Continued)

OTHER PUBLICATIONS

Rüfenacht, M., Error Handling in PEG Parsers: Local Error Recovery for PetitParser, Master Thesis, University of Berne, Switzerland, [retrieved on Dec. 14, 2018], Retrieved from the Internet: <URL:https://pdfs.semanticscholar.org/e4ec/dd5b99f5c643774597e7dc3b67ee1eab0c17.pdf>.*

(Continued)

*Primary Examiner* — Geoffrey R St Leger
(74) *Attorney, Agent, or Firm* — Fujitsu Patent Center

(57) ABSTRACT

A non-transitory computer-readable storage medium storing a program that causes a computer to execute a process, the process including receiving a source code, performing a first analysis that analyzes the received source code in accordance with a specific rule, generating a new source code when at least one error is detected in the first analysis, the new source code having the at least one error corrected, performing a second analysis that analyzes the generated new source code in accordance with the specific rule when the at least one error causes the first analysis to skip analysis of a portion of the received source code, and outputting the new source code when the at least one error does not cause the first analysis to skip the analysis of the portion of the received source code.

20 Claims, 10 Drawing Sheets

(51) Int. Cl.
 *G06F 8/51* (2018.01)
 *G06F 11/07* (2006.01)
(52) U.S. Cl.
 CPC ............. *G06F 8/51* (2013.01); *G06F 11/079* (2013.01); *G06F 11/36* (2013.01); *G06F 11/3688* (2013.01)
(58) Field of Classification Search
 USPC ............... 717/106–113, 124–130, 136, 137, 717/140–161
 See application file for complete search history.

(56) References Cited

U.S. PATENT DOCUMENTS

| | | | | |
|---|---|---|---|---|
| 8,713,534 | B2* | 4/2014 | Balasubramanian | G06F 8/33 717/125 |
| 9,665,467 | B2* | 5/2017 | Angwin | G06F 11/3668 |
| 2004/0078687 | A1* | 4/2004 | Partamian | G06F 11/366 714/38.13 |
| 2007/0226708 | A1* | 9/2007 | Varma | G06F 8/51 717/139 |
| 2008/0052695 | A1* | 2/2008 | Dickenson | G06F 8/436 717/151 |
| 2010/0050154 | A1* | 2/2010 | Balasubramanian | G06F 8/33 717/113 |
| 2013/0152061 | A1* | 6/2013 | Golde | G06F 8/427 717/143 |
| 2017/0004065 | A1* | 1/2017 | Angwin | G06F 11/3668 |

FOREIGN PATENT DOCUMENTS

| | | |
|---|---|---|
| JP | 6-242960 | 9/1994 |
| JP | 11-85536 | 3/1999 |
| JP | 11-296366 | 10/1999 |

OTHER PUBLICATIONS van der Spek, P., et al., Syntax error repair for a Java-based parser generator, ACM SIGPLAN Noticesvol. 40 Issue 4, Apr. 2005, pp. 47-50, [retrieved on May 17, 2019], Retrieved from the Internet.*

Grune, D., et al., Parsing Techniques a Practical Guide, selected pages on Panic Mode and Follow set error recovery, 1998, 4 pages, [retrieved on May 17, 2019], Retrieved from the Internet.*

* cited by examiner

FIG. 1

```
1  PROGRAM-ID. SAMPLE1.
2  WORKING-STORAGE SECTION.
3  01  WDATA1 PIC X(20).
4  01  WDATA2 PIC X(20).
5  01  WDATA3 PIX X(40).
6  PROCEDURE DIVISION.
7      STRING WDATA1 WDATA2 DELIMITED BY SIZE INTO WDATA3.
```
100

| LINE | ERROR CODE | |
|------|------------|---|
| 2 | S135 | ERRONEOUS WORD OF 'WORKING-STORAGE' IS SPECIFIED. PORTION LEADING UP TO SUBSEQUENT PARAGRAPH OR DIVISION IS INVALID. |
| 7 | S250 | USER WORD OF 'WDATA1' IS NOT DEFINED. |

110

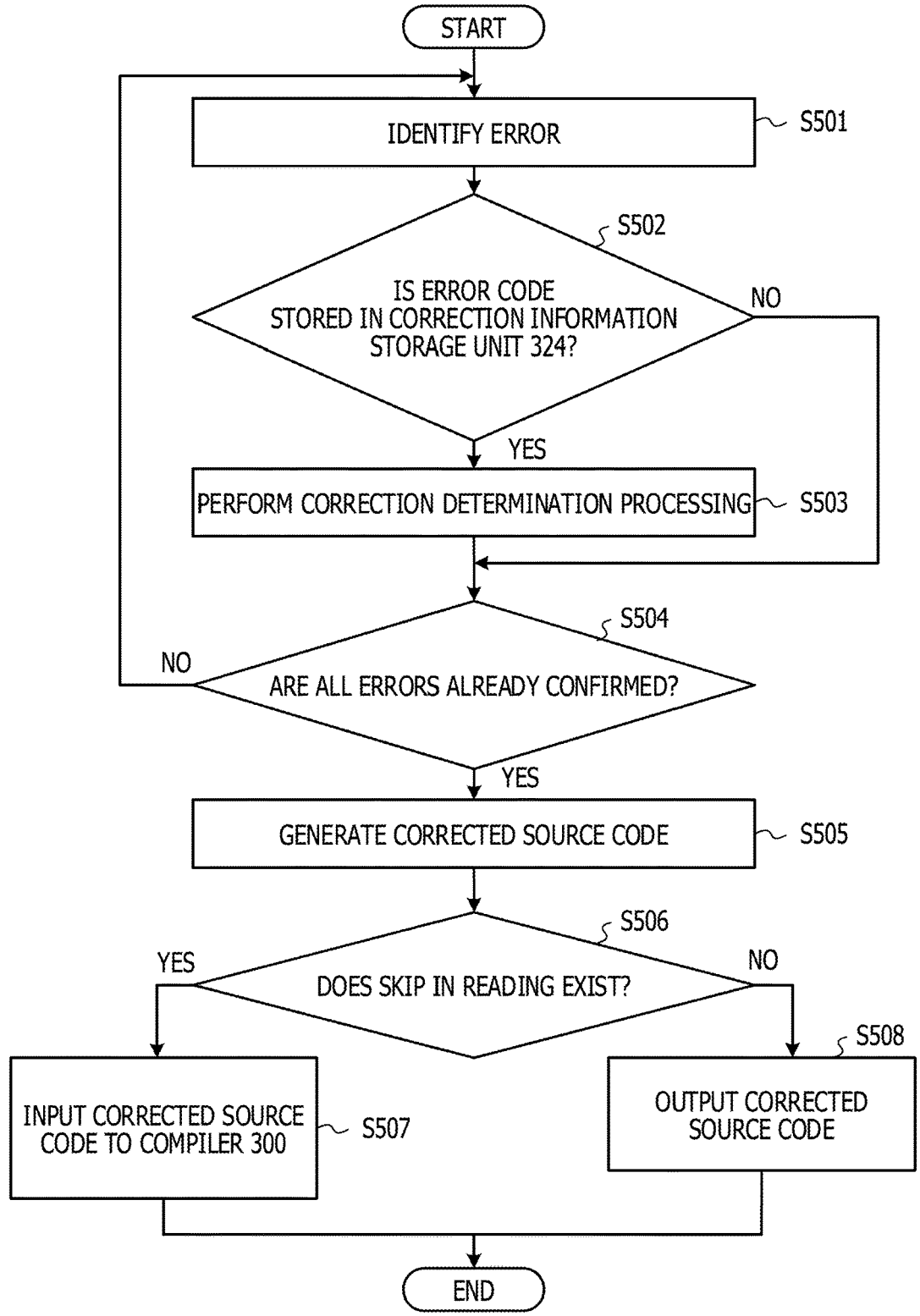

FIG. 6

| ERROR CODE 601 | SKIP-IN-READING FLAG 602 | SKIP-IN-READING RANGE INFORMATION 603 | CHECK ITEM INFORMATION 604 | COPING INFORMATION 605 | PRIORITY INFORMATION 606 |
|---|---|---|---|---|---|
| 135 | ON | UP TO SUBSEQUENT PARAGRAPH OR DIVISION | SPELLING OF WORD IS COINCIDENT WITH RESERVED WORD | IN CASE WHERE THERE ARE RESERVED WORDS, DEGREE OF SIMILARITY OF EACH OF WHICH IS GREATER THAN OR EQUAL TO 60%, REPLACE WITH RESERVED WORD HAVING HIGHEST DEGREE OF SIMILARITY | 1 |
| 135 | ON | UP TO SUBSEQUENT PARAGRAPH OR DIVISION | "DATA DIVISION" IS DEFINED | ADD DESCRIPTION OF "DATA DIVISION." TO HEAD OF "DIVISION" | 2 |
| 250 | OFF | — | "DATA DIVISION" IS ALREADY ANALYZED | PERFORM NO CORRECTION | 1 |
| 250 | OFF | — | SPELLING OF WORD WITHIN "WORKING-STORAGE SECTION" IS COINCIDENT WITH USER WORD | IN CASE WHERE THERE ARE USER WORDS, DEGREE OF SIMILARITY OF EACH OF WHICH IS GREATER THAN OR EQUAL TO 60%, REPLACE WITH USER WORD HAVING HIGHEST DEGREE OF SIMILARITY IN CASE WHERE THERE IS NO DEFINITION, ADD DESCRIPTION OF DEFINITION | 2 |
| 123 | ON | UP TO SUBSEQUENT RECOGNIZABLE PHRASE, PARAGRAPH, SECTION, OR DIVISION | SPELLING OF WORD IS COINCIDENT WITH RESERVED WORD | IN CASE WHERE THERE ARE RESERVED WORDS, DEGREE OF SIMILARITY OF EACH OF WHICH IS GREATER THAN OR EQUAL TO 60%, REPLACE WITH RESERVED WORD HAVING HIGHEST DEGREE OF SIMILARITY | 1 |
| 222 | OFF | — | DEGREE OF SIMILARITY BETWEEN SPELLING OF WORD AND RESERVED WORD OF "PIC" IS GREATER THAN OR EQUAL TO 60% | REPLACE SPELLING WITH "PIC" | 1 |
| 222 | OFF | — | DEFINITION OF "PICTURE" PHRASE EXISTS WITHIN LINE | ADD DEFINITION OF "PICTURE" PHRASE INTO LINE | 2 |

FIG. 8

```
                                                   ⌐ 800
1   PROGRAM-ID. SAMPLE1.
2   DATA DIVISION.
3   WORKING-STORAGE SECTION.
4     01  WDATA1 PIC X(20).
5     01  WDATA2 PIC X(20).
6     01  WDATA3 PIX X(40).
7   PROCEDURE DIVISION.
8     STRING WDATA1 WDATA2 DELIMITED BY SIZE INTO WDATA3.
```

FIG. 9

| LINE | ERROR CODE | |
|---|---|---|
| 6 | S123 | UNACCEPTABLE WORD OF 'PIX' OCCURS. PORTION LEADING UP TO SUBSEQUENT RECOGNIZABLE PHRASE, PARAGRAPH, SECTION, OR DIVISION IS INVALID. |
| 6 | S222 | NO "PICTURE" PHRASE EXISTS. |

```
1   PROGRAM-ID. SAMPLE1.
2   DATA DIVISION.
3   WORKING-STORAGE SECTION.
4     01  WDATA1 PIC X(20).
5     01  WDATA2 PIC X(20).
6     01  WDATA3 PIC X(40).
7   PROCEDURE DIVISION.
8       STRING WDATA1 WDATA2 DELIMITED BY SIZE INTO WDATA3.
```

NON-TRANSITORY COMPUTER-READABLE STORAGE MEDIUM, CORRECTION SUPPORT METHOD AND CORRECTION SUPPORT DEVICE

CROSS-REFERENCE TO RELATED APPLICATION

This application is based upon and claims the benefit of priority of the prior Japanese Patent Application No. 2016-227326, filed on Nov. 22, 2016, the entire contents of which are incorporated herein by reference.

FIELD

The embodiments discussed herein are related to a non-transitory computer-readable storage medium, a correction support method and a correction support device.

BACKGROUND

In software development, software developers and so forth each create a source code by using a program language. The created source code is compiled by a compiler, thereby being converted into a program having a format executable by an information processing device.

In a case where an improper description (an erroneous description or a description missing) exists in the source code, an error is detected at a time of execution of a compilation by the compiler. In such a case, a developer of the source code confirms a content of the detected error and corrects the description causing the error. In addition, the compilation is performed on the corrected source code again.

As a technique for supporting creation of a source code, as disclosed in, for example, Japanese Laid-open Patent Publication No. 1-307832, there exists a technique for creating a dictionary in which an error and a correction method for the error are associated with each other, thereby causing a computer to support an error recovery (a correction of the source code), based on the dictionary.

SUMMARY

According to an aspect of the invention, a non-transitory computer-readable storage medium storing a program that causes a computer to execute a process, the process including receiving a source code, performing a first analysis that analyzes the received source code in accordance with a specific rule, generating a new source code when at least one error is detected in the first analysis, the new source code having the at least one error corrected, performing a second analysis that analyzes the generated new source code in accordance with the specific rule when the at least one error causes the first analysis to skip analysis of a portion of the received source code, and outputting the new source code when the at least one error does not cause the first analysis to skip the analysis of the portion of the received source code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a source code serving as an example of a source code and an error list indicating errors detected in a case where the source code is compiled;

FIG. 5 illustrates a flowchart indicating a flow of a series of processing operations executed by a source code correction unit;

FIG. 6 illustrates an example of information stored in a correction information storage unit;

FIG. 8 illustrates a corrected source code in the present embodiments;

FIG. 9 illustrates an error list in the present embodiments; and

DESCRIPTION OF EMBODIMENTS

Figure 2:
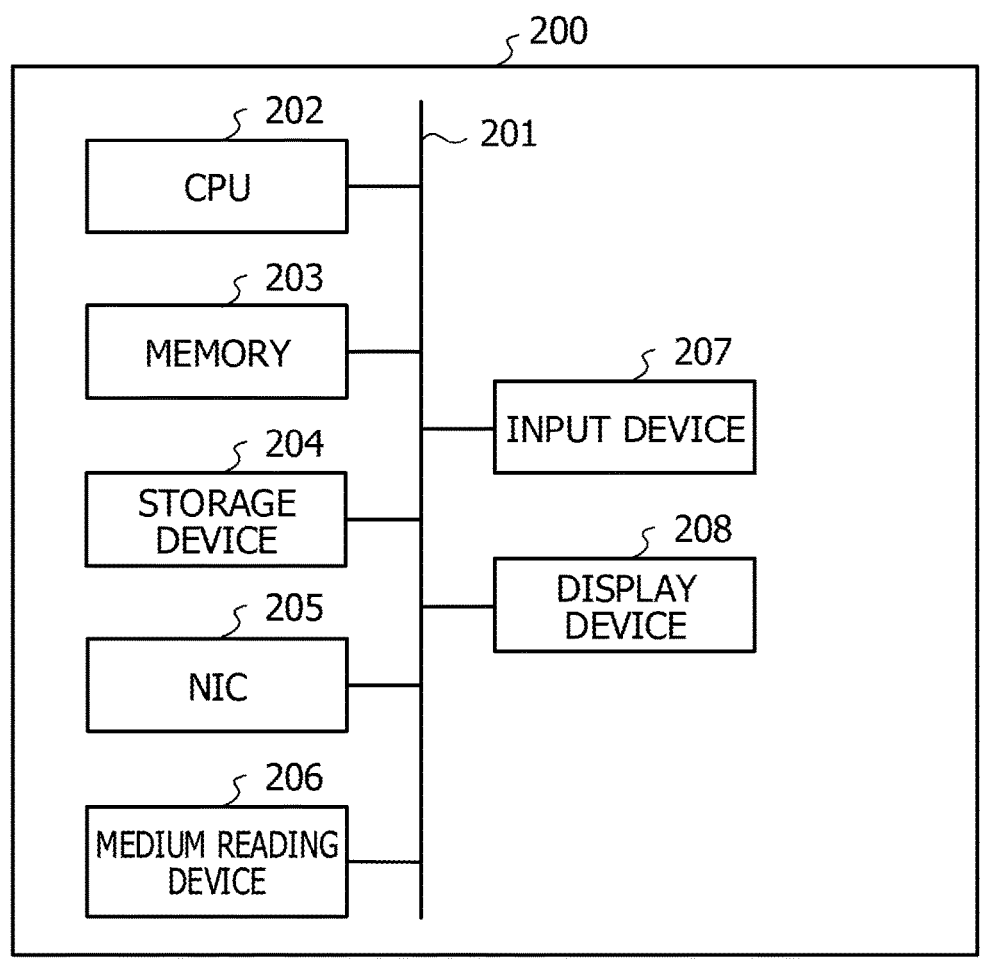
FIG. 2 illustrates an example of a hardware configuration of an information processing device.

At a time of a compilation, there occurs an event (a skip in reading) in which a compilation performed on a source code is partially skipped depending on the type of a detected error. An example of the skip in reading will be described by using FIG. 1.

FIG. 1 illustrates a source code 100 serving as an example of the source code and an error list 110 indicating errors detected in a case where the source code 100 is compiled. Note that, for the sake of the following description, in the source code 100 in FIG. 1, line numbers ("1" to "7") are described in left ends of respective lines of the source code.

The compilation of the source code 100 is executed from the head of the source code (a description of the line number of "1" in FIG. 1). In a case where a description unrecognizable to the compiler occurs during the execution of the compilation, an error is detected.

In a case of the source code 100 in FIG. 1, in a portion of the line number of "2", "WORKING-STORAGE SECTION." is described, and an error having an error code of "S135", such as "an erroneous word of 'WORKING-STORAGE' is specified. A portion leading up to a subsequent paragraph or division (DIVISION) is invalid.", is detected. Note that error codes are pieces of identification information uniquely assigned to various errors that may occur at a time of a compilation.

Due to the error having the error code of "S135", a compilation of descriptions of the line numbers of "2" to "5" is skipped by processing (called a recovery function, for example) of the compiler. In addition, the compilation processing is resumed from a description of the line number of "6". After resuming the compilation, in a portion of the line number of "7", "STRING WDATA1 WDATA2 DELIMITED BY SIZE INTO WDATA3." is described, and an error having an error code of "S250", such as "a user word of 'WDATA1' is not defined.", is detected.

By the way, in the source code 100 in FIG. 1, "01 WDATA3 PIX X(40)." is described in a portion of the line number of "5". However, regarding this description, normally a description of "01 WDATA3 PIC X(40)." is a proper description. In addition, in a case where this description of "01 WDATA3 PIX X(40)." is compiled, an error is detected. In this regard, however, in the example illustrated in FIG. 1, as described above, a compilation of descriptions of the line numbers of "2" to "5" is skipped due to the error having the error code of "S135". Therefore, in the execution of a single compilation, no error is detected. In addition, only after the compilation is executed on the descriptions of the line numbers of "2" to "5" in a corrected source code in which the description causing the error having the error code of, for example, "S135" is corrected by a source code creator, an error turns out to be detected.

Like the above-mentioned example, in order to detect a description that is included in the source code and that causes an error, the compilation of the source code and a work performed by the source code creator to correct the source code have to be repeated.

In addition, the above-mentioned error having the error code of "S250" indicates that "WDATA1" is not defined in descriptions preceding the line number 7 in which the error is detected. In this regard, however, in a case of the source code 100 in FIG. 1, although "WDATA1" is defined in a description of "01 WDATA1 PIC X(20)." of the line number of "3", the error having the error code of "S250" turns out to be detected. In other words, while the error having the error code of "S250" is detected, a portion of the line number of "7" is a proper description. The reason why the error having the error code of "S250" is detected although "WDATA1" is defined in FIG. 1 is that, due to the error code of "S135", a skip in reading occurs for the descriptions of the line numbers of "2" to "5".

In a case where the source code is corrected based on the error list 110 in FIG. 1, a correction such as adding, into the source code, a description for defining "WDATA1" regarded as undefined is conceivable, for example. However, in a case where, for the source code 100, a description causing the error having the error code of "S135" is set and the source code in a state in which the description for defining "WDATA1" is additionally written is compiled again, a new error is incurred due to the correction. Specifically, at two points containing the portion of the line number of "5", in which a skip in reading occurs at a time of the previous compilation, and the description that is additionally written in the correction and that is used for defining "WDATA1", a definition of "WDATA1" is duplicated (called a dual definition, for example). In addition, due to the duplicated definition, a new error that does not occur in the previous compilation turns out to occur at a time of a compilation.

As described above, there is a possibility that the occurrence of a skip in reading makes a description unfindable, the description serving as a cause of an error and being included in a portion in which the skip in reading occurs or a possibility that a correction executed without regard for a skip in reading causes a new error to occur. Therefore, the number of times of compilations performed until a source code in which no error occurs in a compilation is created is increased, for example. In addition, in addition to an increase in the number of times of compilations, the total number of errors to be corrected is increased, for example. Accordingly, a workload of the source code creator is increased or a processing cost of a computer to execute a compilation is increased.

An object according to one aspect is to reduce a load on a correction of a source code.

Embodiments for implementing the present technology will be described with drawings.

Hardware Configuration

FIG. 2 is an example of a hardware configuration of an information processing device 200 serving as one of embodiments of the present technology. The information processing device 200 is a computer including a central processing unit (CPU) 202, a memory 203, a storage device 204, a network interface controller (NIC) 205, a medium reading device 206, an input device 207, and a display device 208, coupled to one another via a bus 201, for example.

The CPU 202 performs various types of operation control in the information processing device 200. The memory 203 and the storage device 204 are able to store therein a program for performing various kinds of processing operations described in the present embodiments and various pieces of data used for the various kinds of processing operations. The storage device 204 is a storage medium such as, for example, a hard disk drive (HDD) or a solid state drive (SSD).

Here, the CPU 202 may be a hardware circuit (processor) such as, for example, a micro processing unit (MPU) or an application specific integrated circuit (ASIC). The CPU 202 may read the program stored in the memory 203 or the storage device 204 and may execute processing and control, thereby realizing individual functional units included in a compiler 300 and a source code correction unit 310 illustrated in FIG. 3. In addition, each of the memory 203 and the storage device 204 is able to function as a storage unit 320 described in FIG. 3. Note that details of the compiler 300, the source code correction unit 310, and the storage unit 320 will be described later with FIG. 3.

The NIC 205 is hardware used for transmission and reception of data via a wired or wireless network. Under control from the CPU 202, the NIC 205 is able to function as a communication unit 104.

The medium reading device 206 is a device for reading data from a recording medium and is a disk drive to read data stored in a disk medium, a card slot to read data stored in a memory card, a device port to read data from a flash memory, or the like, for example. All or part of the data stored in the above-mentioned storage unit 320 may be stored in a recording medium readable by using the medium reading device 206.

The input device 207 is a device to receive an input or specification from a user of the information processing device 200. As examples of the input device 207, a keyboard, a mouse, and a touch pad may be cited, for example. Under control from the CPU 202, the display device 208 displays various pieces of information. The display device 208 is a liquid crystal display, for example. Note that, in a case where a client device 1 is, for example, a smartphone, a PDA, or a tablet PC, a touch panel equipped with the function of the input device 207 and the function of the display device 208 may be used.

Software Configuration

Figure 3:
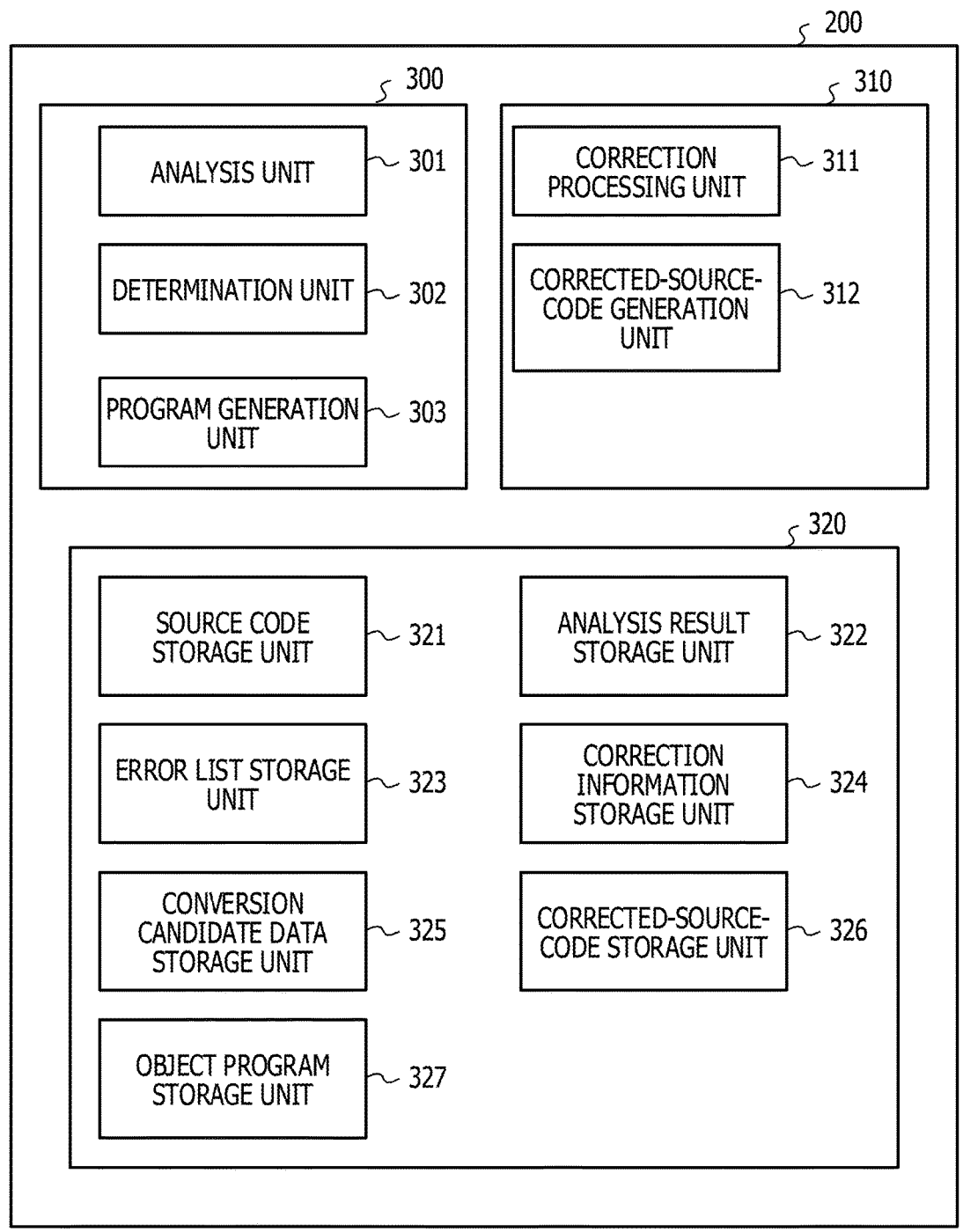
FIG. 3 illustrates a functional block diagram indicating a software configuration of the information processing device.

FIG. 3 is a functional block diagram indicating a software configuration of the information processing device 200 serving as one of embodiments of the present technology. The information processing device 200 includes the compiler 300, the source code correction unit 310, and the storage unit 320.

An outline of the compiler 300 will be described. The compiler 300 is a functional unit to execute a compilation of a source code, thereby generating a program (object program) obtained by converting the source code. The compiler 300 includes an analysis unit 301, a determination unit 302, and a program generation unit 303.

The analysis unit 301 executes, on an input source code, analysis processing operations such as a lexical analysis, a syntax analysis, and a semantic analysis. Note that, in a case where errors are detected in the executed analyses, the analysis unit 301 outputs an error list for identifying the detected errors.

The determination unit 302 determines whether or not an error is included in results of the analyses executed by the analysis unit 301. In a case where, as a result of the determination, an error is included in results of the analyses executed by the analysis unit 301, the determination unit 302 gives notice to the source code correction unit 310.

Based on the results of the analyses executed by the analysis unit 301, the program generation unit 303 converts the input source code, thereby generating an object program. In addition, the program generation unit 303 is able to output the generated object program to a desired output destination.

An outline of the source code correction unit 310 will be described. The source code correction unit 310 includes a correction processing unit 311 and a corrected-source-code generation unit 312.

In a case where an error is detected in the analyses executed by the analysis unit 301, the correction processing unit 311 executes a correction of the source code on the source code input to the compiler 300.

The corrected-source-code generation unit 312 is able to output, to a desired output destination, the source code on which the correction is performed by the correction processing unit 311. Note that details of processing operations performed by the correction processing unit 311 and the corrected-source-code generation unit 312 will be described later.

An outline of the storage unit 320 will be described. The storage unit 320 includes a source code storage unit 321, an analysis result storage unit 322, an error list storage unit 323, a correction information storage unit 324, a conversion candidate data storage unit 325, a corrected-source-code storage unit 326, and an object program storage unit 327. Note that details of pieces of information stored in the individual storage units will be described later, along with details of processing operations performed by the correction processing unit 311 and the corrected-source-code generation unit 312.

In the present embodiments, it is assumed that the compiler 300, the source code correction unit 310, and the storage unit 320 operate on the information processing device 200. In this regard, however, it may be assumed that the compiler 300, the source code correction unit 310, and the storage unit 320 are realized by using computers. In addition, the storage unit 320 may be realized by a storage device that is located outside the information processing device 200 and that is accessible by the information processing device 200, for example.

Note that while, in FIG. 3, individual functional units in the information processing device 200 are described by being divided into the compiler 300 and the source code correction unit 310, a specific embodiment does not have to be limited to FIG. 3, and the individual functional units only have to be included in at least one of the compiler 300 and the source code correction unit 310. Alternatively, an embodiment may be a compiler having the function of the source code correction unit 310 described in FIG. 3.

Processing in Compiler 300

Figure 4:
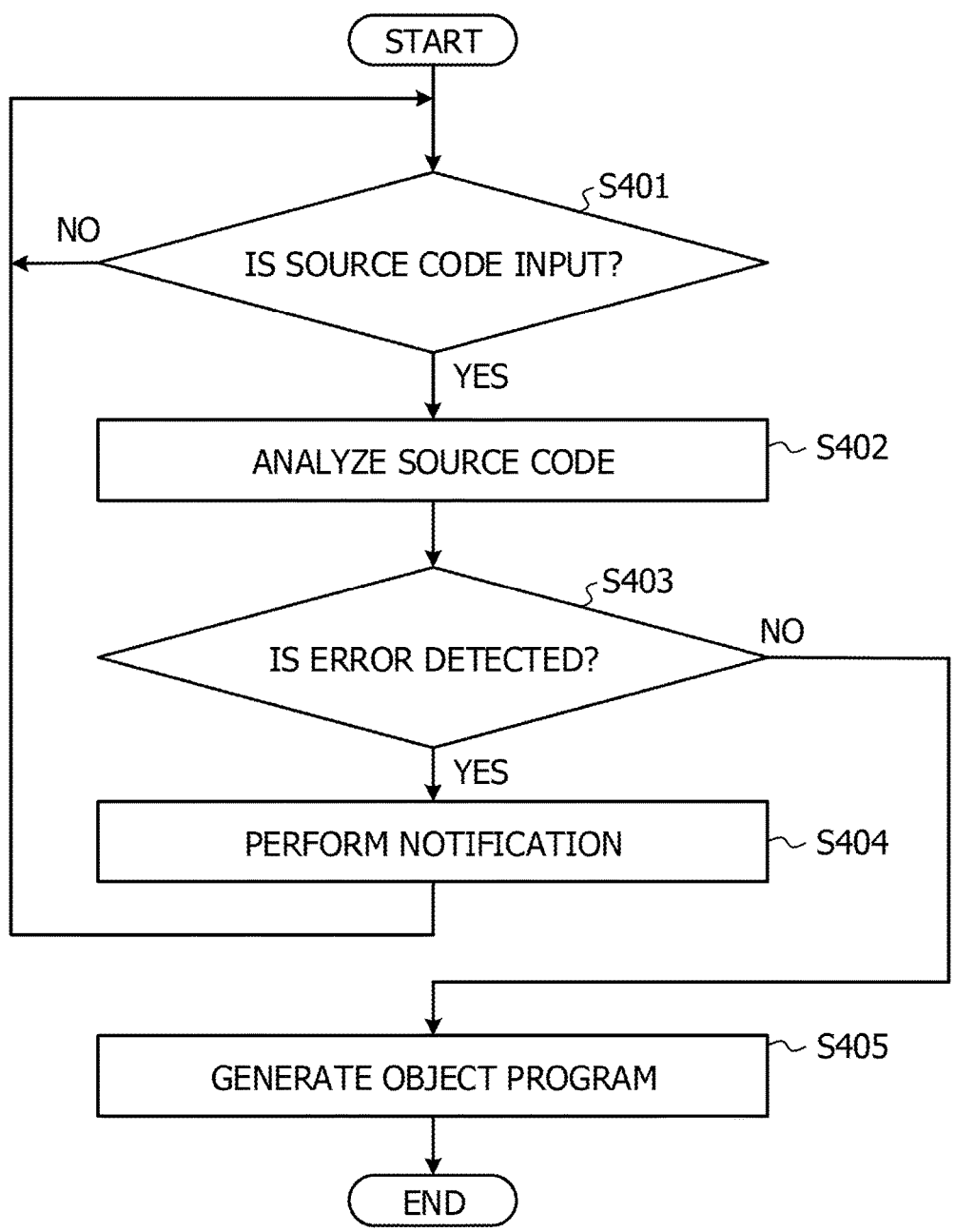
FIG. 4 illustrates a flowchart indicating a flow of a series of processing operations executed by a compiler.

FIG. 4 is a flowchart indicating a flow of a series of processing operations executed by the compiler 300. By using FIG. 4, processing performed by the compiler 300 will be described.

First, the compiler 300 determines whether or not a source code serving as a target of an analysis and a compilation is input (step S401). In a case where the source code is input (step S401: YES), the processing makes a transition to step S402. On the other hand, in a case where no source code is input (step S401: NO), the processing operation in step S401 is repeated. In other words, at this time, the compiler 300 waits for inputting of a source code.

After the source code is input, the analysis unit 301 performs analysis processing on the input source code (step S402). Note that, in a case where an error is detected at a time of the analysis processing, the analysis unit 301 outputs an error list for identifying the detected error. Specifically, the error list for identifying the detected error is generated and may be stored in the error list storage unit 323, for example. In a case where the source code 100 in FIG. 1 is input in step S401, errors are detected as a result of the analysis processing, and the error list 110 in FIG. 1 is output, for example.

In the analysis processing in step S402, the determination unit 302 determines whether or not an error is detected (step S403). In a case where an error is detected (step S403: YES), the determination unit 302 gives, in response to the detection of the error, notice to the source code correction unit 310 to the effect that the error is detected (step S404). Note that, in accordance with the notice, after-mentioned correction processing for the source code turns out to be performed in the source code correction unit 310. After step S404, the processing returns to the processing operation in step S401.

On the other hand, in a case where no error is detected in the analysis processing in step S402 (step S403: NO), the program generation unit 303 converts, based on the result of the analysis processing, the source code input in step S401, thereby generating an object program (step S405), and terminates the series of processing operations illustrated in FIG. 4. Note that, after the processing operation in step S405 finishes, the compiler 300 may perform the processing operation in step S401 again.

Processing in Source Code Correction Unit 310

As described above, in a case where an error is detected in the analysis processing performed by the analysis unit 301, the source code correction unit 310 performs the correction processing on the source code. Processing performed by the source code correction unit 310 will be described by using a drawing and a specific example. In the following description, a case where the correction processing for the source code is performed on the source code 100 illustrated in FIG. 1 will be exemplified. Note that the source code 100 illustrated in FIG. 1 is a source code described by using a common business oriented language (COBOL) as a programming language. In this regard, however, the technology disclosed in the present embodiments is applicable in a case where the source code is created by using a programming language other than the COBOL.

FIG. 5 is a flowchart indicating a flow of a series of processing operations executed by the source code correction unit 310.

Upon receiving the notice from the determination unit 302 in the compiler 300, the correction processing unit 311 performs identification of the detected error (step S501). The correction processing unit 311 references the error list stored in the error list storage unit 323, thereby reading one of error codes included in the error list. The correction processing unit 311 reads the error code of "S135" from the error list 110 illustrated in FIG. 1, for example.

Next, the correction processing unit 311 references the correction information storage unit 324, thereby determining whether or not an error code coincident with the error code read in step S501 is stored in the correction information storage unit 324 (step S502). In a case where an error code coincident with the error code read in step S501 is stored in the correction information storage unit 324 (step S502: YES), the correction processing unit 311 performs correction determination processing (step S503). On the other hand, in a case where no error code coincident with the error code read in step S501 is stored in the correction information storage unit 324 (step S502: NO), the processing makes a transition to a processing operation in step S504.

Correction Information Storage Unit 324

FIG. 6 is a diagram illustrating an example of information stored in the correction information storage unit 324. The correction information storage unit 324 stores therein an error code 601, a skip-in-reading flag 602, skip-in-reading range information 603, check item information 604, coping information 605, and priority information 606 illustrated in FIG. 6, for example.

The error code 601 is equivalent to pieces of identification information uniquely assigned to various errors that may occur at a time of a compilation. In the present embodiments, it is assumed that error codes are assigned based on the same system as that of the errors illustrated in FIG. 1.

The skip-in-reading flag 602 is information for identifying whether or not an error causes a skip in reading in the source code to occur in the compilation. In FIG. 6, "ON" is input as a value in a case where a skip in reading occurs, and "OFF" is input as a value in a case where no skip in reading occurs. In this regard, however, in a case where it is possible to distinguish whether or not an error causes a skip in reading in the source code to occur in the compilation, a specific method for setting values does not have to be limited to the embodiment in FIG. 6.

The skip-in-reading range information 603 is information for identifying a range of the source code, which serves as a target of the skip in reading, with respect to an error causing the skip in reading to occur. In FIG. 6, the error having the error code of "S135" indicates that a skip in reading occurs up to "a subsequent paragraph or division (DIVISION)", for example. Note that, in a case of the source code 100 in FIG. 1, in a case where a skip in reading caused by an error having the error code of "S135" occurs in a portion of the line number="2", "PROCEDURE DIVISION" indicating the subsequent "division" is described in a portion of the line number="6". Accordingly, a skip in reading in the source code is performed on the description of portions of the line numbers="2" to "5". On the other hand, regarding an error not causing a skip in reading in the source code to be performed, for example, an error having the error code of "S250" in FIG. 6, no skip in reading in the source code occurs due to the error. Therefore, no value may be input to a portion of the skip-in-reading range information 603.

The check item information 604 is information indicating, for each of the error codes, a check content of a description of the source code in a case where an error occurs.

A case of, for example, FIG. 6 indicates that, regarding two things to be checked containing "a spelling of a word is coincident with a reserved word" and "DATA DIVISION is defined", the correction processing unit 311 checks an error having the error code of "S135". In addition, it is indicated that, regarding "a spelling of a word is coincident with a reserved word", the correction processing unit 311 checks an error having the error code of "S250". In addition, it is indicated that, regarding two things to be checked containing "DATA DIVISION is already analyzed" and "a spelling of a word within WORKING-STORAGE SECTION is coincident with a user word", the correction processing unit 311 checks an error having the error code of "S250".

The coping information 605 is information indicating a correction method for a source code, performed in a case where a description of the source code satisfies none of things to be checked illustrated in the check item information 604. In addition, the priority information 606 is information indicating a priority in a case of checking performed by the correction processing unit 311 in a case where check items exist for an error. In FIG. 6, an execution order of checking is indicated by numerical values.

A description returns to the flowchart of FIG. 5. In step S502, the correction processing unit 311 determines whether or not the error code of "S135" is stored in the correction information storage unit 324, for example. In the present exemplification, as illustrated in FIG. 6, the error code of "S135" is stored in the correction information storage unit 324 (step S502: YES). Therefore, the correction processing unit 311 performs the correction determination processing in step S503.

In the correction determination processing in step S503, first a content of the check item information 604, which is associated with an error code coincident with the error code read in step S501 and which is included in the correction information storage unit 324, is referenced. In addition, based on the referenced content of the check item information 604, checking of a description of the source code is performed.

The correction determination processing in step S503 will be described with citing a specific example. For, for example, the source code 100 in FIG. 1, based on the priority information 606, first the correction processing unit 311 performs checking of "a spelling of a word is coincident with a reserved word" serving as the first check item. In a portion of the line number of "2" of the source code 100, "WORKING-STORAGE SECTION." is described. The correction unit 311 references the conversion candidate data storage unit 325, thereby determining whether or not a spelling of "WORKING-STORAGE" causing an error is coincident with a reserved word.

Conversion Candidate Data Storage Unit 325

Figure 7:
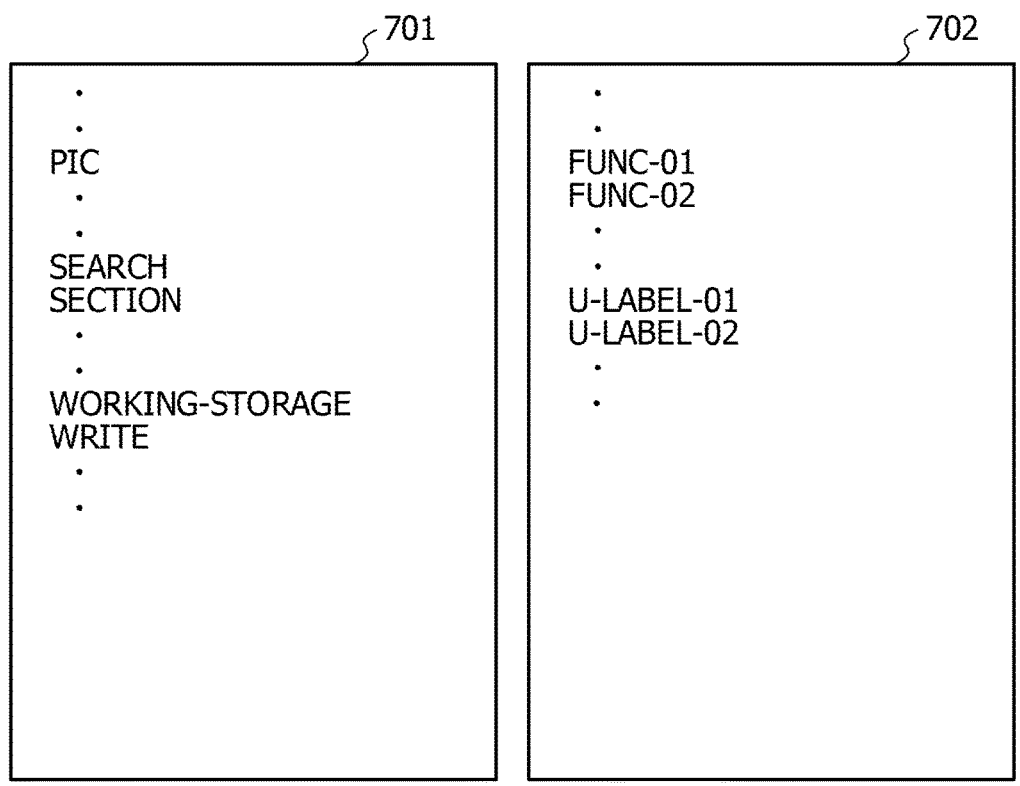
FIG. 7 illustrates an example of information stored in a conversion candidate data storage unit.

FIG. 7 is a diagram illustrating an example of information stored in the conversion candidate data storage unit 325. The conversion candidate data storage unit 325 stores therein candidates for spellings after corrections in a case where the correction processing unit 311 performs corrections of spellings of words in the source code, for example. In the present embodiments, the conversion candidate data storage unit 325 roughly stores therein reserved word data 701 and user word data 702.

The reserved word data 701 is information for identifying lexical elements (tokens) defined as reserved words in a programming language serving as a target. In the present embodiments, the COBOL is defined as the programming language serving as a target. Therefore, as illustrated in, for example, FIG. 7, it is indicated that the reserved word data 701 includes, as the reserved words, lexical elements such as "SEARCH", "SECTION", "WORKING-STORAGE", and "WRITE".

The user word data 702 is a storage unit to store therein user words. The user words mean lexical elements defined, as variable names and labels to be described in the source code, by a creator of the source code and users of programs, for example. As illustrated in, for example, FIG. 7, it is indicated that the user word data 702 includes, as the user words, lexical elements such as "FUNC-01", "FUNC-02", "U-LABEL-01", and "U-LABEL-02".

It may be assumed that, in the conversion candidate data storage unit 325, the reserved word data 701 and the user word data 702 are acquired and stored in conformity with the programming language serving as a target and the users, for example. In addition, in a case where, for execution of a compilation, the compiler 300 holds, for example, list data (not illustrated) of reserved words and user words, the correction processing unit 311 may reference the list data or may copy the list data to the conversion candidate data storage unit 325, thereby using it.

Returning to a description of step S503 in FIG. 5, as illustrated in FIG. 7, "WORKING-STORAGE" is a lexical element defined as one of the reserved words. Accordingly, regarding the first check item, the correction processing unit 311 determines that a spelling of a word is coincident with one of the reserved words.

Next, regarding the second check item of "DATA DIVISION is defined" associated with the error code of "S135", the correction processing unit 311 performs checking. In the COBOL, in the source code, "DATA DIVISION." has to be described before a description of "WORKING-STORAGE SECTION.". However, in the source code 100 in FIG. 1, no description of "DATA DIVISION." exists before "WORKING-STORAGE SECTION.". Accordingly, regarding the second check item, the correction processing unit 311 determines that "DATA DIVISION" is not defined, in other words, a description of the source code does not satisfy the check item.

In a case where it is determined that the check item is not satisfied, the correction processing unit 311 references the coping information 605 in the correction information storage unit 324. In the coping information 605 associated with the error code of "S135", "add a description of "DATA DIVISION." to the head of "DIVISION"" is indicated as a way of coping corresponding to the second check item. Therefore, the correction processing unit 311 determines that a correction for additionally writing a description of "DATA DIVISION." to a portion that corresponds to the head of "DIVISION" and that precedes the description of the line number="2" causing an error having the error code of "S135" is to be performed on the source code 100. Note that, in a case of the source code 100, a space between the line number="1" and the line number="2" corresponds to the head of "DIVISION".

As described above, a correction method for the source code 100, which corresponds to the error code of "S135", is determined. Note that, in case that, regarding the first check item of "a spelling of a word is coincident with a reserved word", it is determined that a description of the source code does not satisfy the check item, a correction method that corresponds to the first check item and that is indicated by the coping information 605 is adopted. In that case, regarding the second check item, even in a case where it is determined that the check item is not satisfied, it is assumed that a correction corresponding to the second check item is not to be performed. The reason is that it is conceivable that, by performing a correction corresponding to the first check item, the source code is corrected so that no error is detected even in a case where the correction corresponding to the second check item is not performed.

After performing the correction determination processing in step S503, the correction processing unit 311 determines whether or not all errors indicated by the error list are already confirmed (step S504). In a case where all the errors indicated by the error list are not already confirmed (step S504: NO), the correction processing unit 311 returns to step S501 and reads one of error codes, which is not yet read and which is indicated by the error list, thereby repeating the processing operations in and after step S502. On the other hand, in a case where all the errors indicated by the error list are already confirmed (step S504: YES), the processing makes a transition to a processing operation in step S505.

Here, in, for example, a stage in which, as described above, only the correction determination processing corresponding to the error code of "S135" is completed for the source code 100 in FIG. 1, the error code of "S250" remains as an error not already confirmed. Accordingly, the correction processing unit 311 reads the error code of "S250" from the error list 110 illustrated in FIG. 1.

In addition, the correction processing unit 311 determines whether or not the error code of "S250" is stored in the correction information storage unit 324. In the present exemplification, as illustrated in FIG. 6, the error code of "S250" is stored in the correction information storage unit 324 (step S502: YES). Therefore, with respect to the error code of "S250", the correction processing unit 311 performs the correction determination processing in step S503 again.

Here, the correction determination processing in step S503 will be described again while exemplifying an error having the error code of "S250". The correction processing unit 311 references a content of the check item information 604, which is associated with the error code of "S250" and which is included in the correction information storage unit 324. Based on the check item information 604 associated with the error code of "S250" and the priority information 606, first the correction processing unit 311 performs, on an error having the error code of "S250", checking regarding the first check item of "DATA DIVISION is already analyzed".

Here, in the COBOL, in a case where "DATA DIVISION" is analyzed, internal data indicating an analysis result is generated by the analysis unit 301 and is stored in a storage area of the storage unit 320, for example. Accordingly, based on whether or not internal data corresponding to "DATA DIVISION" exists, the correction processing unit 311 is able to determine whether or not "DATA DIVISION" is already analyzed.

Note that, at a point of time when the source code 100 in FIG. 1 is compiled, no internal data corresponding to "DATA DIVISION" is generated. The reason is that a skip in reading in the source code, caused by an error having the error code of "S135", inhibits analysis processing and a compilation from being performed on the descriptions of the line numbers of "2" to "5" of the source code 100, which are descriptions corresponding to "DATA DIVISION". Accordingly, the correction processing unit 311 determines that a description of the source code 100 does not satisfy the first check item of "DATA DIVISION is already analyzed".

Since determining that a description of the source code 100 does not satisfy the first check item, the correction processing unit 311 determines that a correction method that corresponds to the first check item of "DATA DIVISION is already analyzed" and that is indicated by the coping information 605 is to be applied to the source code 100.

Here, the correction method corresponding to the first check item of "DATA DIVISION is already analyzed" is equivalent to "perform no correction". In this case, as a result, a correction of a description of the source code 100, which corresponds to an error having the error code of "S250", is not performed. If a description of the source code 100 does not satisfy the second check item at all, no correction of a description of the source code 100 corresponding to an error having the error code of "S250" is performed in accordance with "perform no correction" serving as the correction method corresponding to the first check item. The reason is that, in a case where, in a state in which "DATA DIVISION" is not analyzed, a description for adding a description of a definition is added based on the coping information 605 corresponding to the second check item, there is a possibility that the above-mentioned dual definition occurs.

After performing the correction determination processing regarding the error code of "S250", the correction processing unit 311 determines whether or not all errors indicated by the error list are already confirmed (step S504). The correction determination processing is performed regarding the error codes of "S135" and "S250", and accordingly, all errors are checked for the error list 110 in FIG. 1. Therefore, the correction processing unit 311 determines that all the errors indicated by the error list are already confirmed (step S504: YES).

In step S505, based on a correction method determined, in the correction determination processing in step S503, to be performed, the correction processing unit 311 generates a new source code (corrected source code).

FIG. 8 illustrates an example of a corrected source code in which correction processing is performed on an error detected for the source code 100 in FIG. 1. A corrected source code 800 in FIG. 8 differs from the source code 100 in FIG. 1 in that a description of "DATA DIVISION." is added before a description of "WORKING-STORAGE SECTION.". Note that no correction is performed on a description of a portion of a line number of "8" (the line number 7 in the source code 100) corresponding to an error having the error code of "S250".

The correction processing unit 311 is able to store the generated corrected source code in the corrected-source-code storage unit 326, for example.

After performing the processing operation in step S505, the correction processing unit 311 determines whether or not an error causing a skip in reading to occur exists in errors checked in steps S501 to S503 (step S506). Specifically, the correction processing unit 311 determines whether or not, in the correction information storage unit 324, one of values of the skip-in-reading flag 602 is set to "ON" regarding the errors checked in steps S501 to S503, for example. In a case where it is determined that one of values of the skip-in-reading flag 602 is set to "ON", in other words, an error causing a skip in reading to occur exists (step S506: YES), the correction processing unit 311 inputs, to the compiler 300, the corrected source code generated in step S505 (step S507). In other words, the correction processing unit 311 causes the compiler 300 to perform processing for a compilation again while defining the corrected source code as a target of the compilation.

On the other hand, in a case where all values of the skip-in-reading flag 602 are set to "OFF", in other words, no error causing a skip in reading to occur exists (step S506: NO), the correction processing unit 311 performs output processing for the corrected source code (step S508). Regarding the output processing, the correction processing unit 311 may cause the corrected source code to be displayed on the display device 208 in the information processing device 200 or may cause the corrected source code to be transmitted to another device (not illustrated) with which the information processing device 200 is communicatable, for example. At a time of displaying the corrected source code on the display device 208, the corrected source code may be displayed in a form in which descriptions (changed characters, a line number in which a correction occurs, an entire line in which a correction occurs, and so forth) of the source code on which corrections are performed by the processing described in the present embodiments are recognizable, for example. Regarding descriptions of the source code on which corrections are performed, there may be adopted a form in which display colors, sizes of characters, font types, and so forth are caused to be different from descriptions not corrected or descriptions of the source code on which corrections are performed are highlighted, for example.

Note that, in a case where an error determined to be difficult to correct in the correction determination processing in step S503 exists in the corrected source code, an error list regarding the error determined to be difficult to correct may be output along with the corrected source code. In addition, in a case where, in step S505, the generated corrected source code is stored in the corrected-source-code storage unit 326, the output processing in step S508 may be omitted while assuming that the output processing for the corrected source code is performed.

Re-Execution of Compilation

As described above, in a case where it is determined that an error causing a skip in reading to occur exists (step S506: YES), the correction processing unit 311 inputs, to the compiler 300, the corrected source code generated in step S505 (step S507). The reason is that there is a possibility that another error not detected in a compilation exists in a portion of the source code, in which a skip in reading occurs. The correction processing unit 311 determines whether or not a skip in reading in the source code, caused by an error, occurs, and in a case where a skip in reading occurs, the correction processing unit 311 controls so that a compilation is performed again on a corrected source code in which the error causing a skip in reading is corrected. For this reason, it is possible to clarify an error undetected due to a skip in reading.

Re-execution of a compilation will be described while citing, as an example, the corrected source code 800 illustrated in FIG. 8. As an example, it is assumed that, based on the above-mentioned processing operation in step S507, the corrected source code 800 is input to the compiler 300 and a compilation of the corrected source code 800 is performed. In a case where the compilation is performed, the analysis processing by the analysis unit 301 is performed on the corrected source code 800.

FIG. 9 illustrates an error list 900 illustrating errors detected in a case where the analysis processing for the corrected source code 800 is performed. The error list 900 in FIG. 9 indicates that, regarding a description of "01 WDATA3 PIX X(40)." of a portion of a line number="6" of the corrected source code 800, an error having an error code of "S123" and an error having an error code of "S222" are detected. The error code of "S123" has a content that "an unacceptable word of 'PIX' occurs. A portion leading up to a subsequent recognizable phrase, paragraph, section (SECTION), or division (DIVISION) is invalid.". In addition, the error having the error code of "S222" has a content that "no PICTURE phrase exists.".

The determination unit 302 in the compiler 300 determines whether or not an error is included in a result of an analysis performed by the analysis unit 301. In the present exemplification, as illustrated in FIG. 9, the error list 900 is output for the corrected source code 800. Therefore, the determination unit 302 gives notice to the source code correction unit 310. In the source code correction unit 310 that receives the notice from the determination unit 302, the series of processing operations illustrated in FIG. 5 is performed on the corrected source code 800.

The processing illustrated in FIG. 5 and performed on the corrected source code 800 will be described. Note that processing operations performed in respective steps and described later are the same processing operations as those in the above-mentioned descriptions except that a target of the processing is the corrected source code 800.

The correction processing unit 311 reads the error code of "S123" from the error list 900 illustrated in, for example, FIG. 9 (step S501). Next, the correction processing unit 311 references the correction information storage unit 324, thereby determining whether or not the error code of "S123" is stored in the correction information storage unit 324 (step S502). With reference to FIG. 6, in the present exemplification, the error code of "S123" is stored in the correction information storage unit 324 (step S502: YES). Therefore, the correction processing unit 311 performs the correction determination processing on the corrected source code 800 (step S503).

The correction determination processing for an error having the error code of "S123" will be described. As illustrated in FIG. 6, as the check item information 604 corresponding to the error code of "S123", "a spelling of a word is coincident with a reserved word" is stored in the correction information storage unit 324. Accordingly, the correction processing unit 311 compares a spelling of "PIX" and a spelling of each of reserved words included in the reserved word information 701 in FIG. 7, thereby determining whether spellings of the two are coincident with each other. In this regard, however, in the present exemplification, it is assumed that a reserved word of "PIX" is not included in the reserved word information 701. Accordingly, the correction processing unit 311 determines that the spelling of "PIX" and none of spellings of respective reserved words included in the reserved word information 701 in FIG. 7 are coincident with each other, in other words, the check matter is not satisfied.

In a case where it is determined that the check matter is not satisfied, the correction processing unit 311 adopts a correction method that is indicated by the coping information 605 and that corresponds to the error of "S123" and the performed check item.

Regarding the word of "PIX" described in the line number of "6" that corresponds to the error having the error code of "S123" and that is included in the corrected source code 800, it is determined whether or not there exists a reserved word for which a spelling of the word has a correlation greater than or equal to a predetermined value. Specifically, the correction processing unit 311 determines the degree of similarity between the spelling of "PIX" and a spelling of each of the reserved words included in the reserved word information 701 in FIG. 7 and determines whether or not there exists a reserved word having the degree of similarity greater than or equal to 60%, for example. Regarding the degree of similarity, a proportion of the number of characters (a length of a character string) coincident between "PIX" and one of individual reserved words included in the reserved word information 701 to the number of characters (a length of a character string) of "PIX" described in the line number of "6" may be calculated, thereby being defined as the degree of similarity, for example.

In addition, in a case where one or more reserved words the degree of similarity of each of which is greater than or equal to 60% exist, the correction processing unit 311 determines that a correction is to be performed so as to replace the description of "PIX" included in the corrected source code 800 with a reserved word having the highest degree of similarity among the one or more reserved words the degree of similarity of each of which is greater than or equal to 60%.

In a case of the present exemplification, a reserved word of "PIC" is included in the reserved word information 701, and a value of the degree of similarity thereof is 67% (rounded off to the nearest whole number) in the above-mentioned calculation method. Therefore, the correction processing unit 311 determines that a correction is to be performed so as to replace the description of "PIX" included in the corrected source code 800 with the reserved word of "PIC".

In this way, a description likely to have an erroneously written reserved word is corrected, thereby resolving an error. Note that the above-mentioned calculation method for the degree of similarity and a threshold value such as 60% are just examples and may be arbitrarily changed. Even the degree of similarity different from that in the above-mentioned calculation method may serve as an alternative if being able to determine the degree of similarity between spellings of two words. Note that the above-mentioned calculation method for the degree of similarity and a threshold value such as 60% are just examples and may be arbitrarily changed. Even the degree of similarity different from that in the above-mentioned calculation method may be replaced with the degree of similarity based on another calculation method if being able to determine the degree of similarity between spellings of two words. After performing the correction determination processing for the error code of "S123", the correction processing unit 311 determines whether or not all errors indicated by the error list are already confirmed (step S504). In the present exemplification, in a stage in which only the correction determination processing for the error code of "S135" is completed, the error code of "S222" remains as an error not already confirmed. Accordingly, the correction processing unit 311 reads the error code of "S222" from the error list 900 illustrated in FIG. 9 (returns to step S501).

The correction processing unit 311 references the correction information storage unit 324, thereby determining whether or not the error code of "S222" is stored in the correction information storage unit 324 (step S502). With reference to FIG. 6, in the present exemplification, the error code of "S222" is stored in the correction information storage unit 324 (step S502: YES). Therefore, the correction processing unit 311 performs the correction determination processing on the corrected source code 800 (step S503).

The correction determination processing for an error having the error code of "S222" will be described. As illustrated in FIG. 6, as the pieces of check item information 604 corresponding to the error code of "S222", "the degree of similarity between a spelling of a word and a reserved word of "PIC" is greater than or equal to 60%" and "a definition of a PICTURE phrase exists within a line" are stored in the correction information storage unit 324. Accordingly, regarding the word of "PIX" described in the line number of "6" that corresponds to an error having the error code of "S123" and that is included in the corrected source code 800, the correction processing unit 311 determines whether or not a spelling of the word has a correlation with the word of "PIX", which is greater than or equal to a predetermined value.

Specifically, the correction processing unit 311 determines whether or not the degree of similarity between the spelling of "PIX" and the spelling of the reserved word of "PIC" is greater than or equal to 60%, for example. It may be assumed that the degree of similarity is calculated in the same way as the degree of similarity described in the correction determination processing for an error having the error code of "S123", for example. In addition, in a case where the degree of similarity is greater than or equal to 60%, the correction processing unit 311 determines that a correction is to be performed so as to replace the description of "PIX" included in the corrected source code 800 with "PIC" serving as one of the reserved words. In the present exemplification, a value of the degree of similarity is 67% (rounded off to the nearest whole number). Therefore, the correction processing unit 311 determines that a correction is to be performed so as to replace the description of "PIX" included in the corrected source code 800 with "PIC" serving as one of the reserved words. In this way, a description likely to have an erroneously written reserved word is corrected, thereby resolving an error. Note that, in the present exemplification, the above-mentioned correction performed on an error having the error code of "S123" has the same content as that of a correction performed on an error having the error code of "S222".

After performing the correction determination processing for the error code of "S222", the correction processing unit 311 determines whether or not all errors indicated by the error list are already confirmed (step S504). The correction determination processing is performed regarding the error codes of "S123" and "S222", and accordingly, all errors are checked for the error list 900 in FIG. 9. Therefore, the correction processing unit 311 determines that all the errors indicated by the error list are already confirmed (step S504: YES). In addition, the correction processing unit 311 generates a new source code (corrected source code (the second round)) in which a result of the correction determination processing in step S503 is reflected (step S505).

Figure 10:
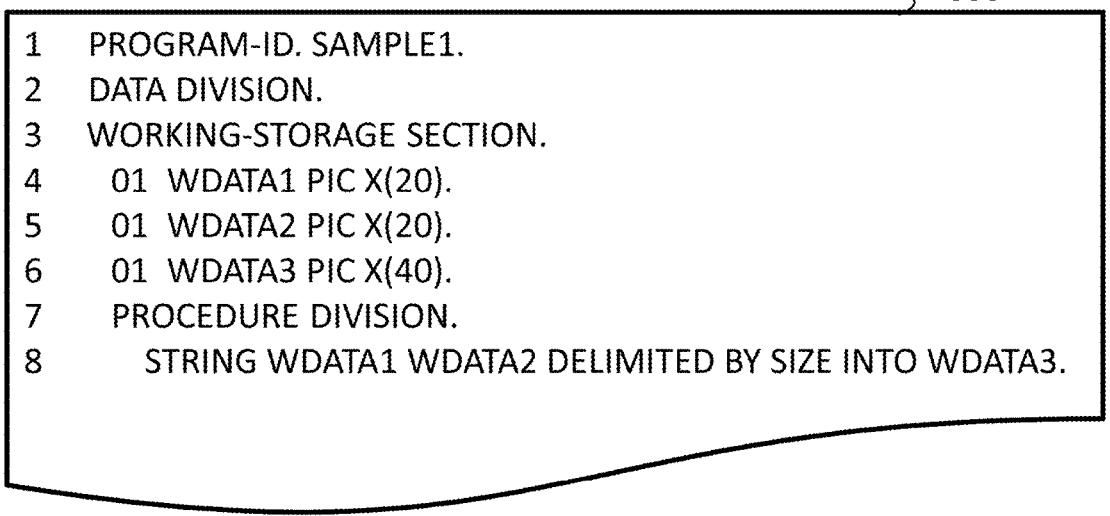
FIG. 10 illustrates a corrected source code in the present embodiments.

FIG. 10 illustrates an example of a corrected source code (the second round)) in which an error detected for the corrected source code 800 in FIG. 8 is corrected.

A corrected source code 1000 in FIG. 10 differs from the corrected source code 800 in FIG. 8 in that the description of a portion of the line number="6" is changed from "01 WDATA3 PIX X(40)." to "01 WDATA3 PIC X(40).".

After performing the processing operation in step S505, the correction processing unit 311 determines whether or not an error causing a skip in reading to occur exists in an error having the error code of "S123", an error having the error code of "S222", and errors checked in steps S501 to S503 (step S506).

In a case of the present exemplification, "ON" is associated, as a value of the skip-in-reading flag 602, with the error code of "S123" stored in the correction information storage unit 324. Therefore, the correction processing unit 311 determines that an error causing a skip in reading to occur exists (step S506: YES). In addition, the correction processing unit 311 causes the compiler 300 to perform processing for a compilation again while defining the corrected source code 1000 as a target of the compilation.

The analysis unit 301 in the compiler 300 performs analysis processing on the corrected source code 1000. Furthermore, the determination unit 302 detects whether or not an error is detected in the analysis processing performed on the corrected source code 1000 by the analysis unit 301.

Regarding the corrected source code 1000, no error is detected in the analysis processing performed by the analysis unit 301. Accordingly, the program generation unit 303 converts the corrected source code 1000, thereby generating an object program.

In other words, regarding the corrected source code 1000, the compiler 300 is able to perform a compilation with detecting no error, thereby generating the object program.

As described above, in the present embodiments, a compilation and correction processing are repeated for an initially input source code as appropriate. Accordingly, it is possible to generate a corrected source code capable of reducing errors in a compilation. In particular, in the present embodiments, in a case where it is determined that an error detected at a time of a compilation causes a skip in reading in a source code to occur, the source code causing the skip in reading is corrected, and after that, a compilation is performed on the corrected source code again. For this reason, not only is an object program according to the corrected source code automatically generated but it is also possible to detect an error that was not detected, due to a skip in reading in the source code, in a previous compilation. In addition, regarding an error for which there is a possibility that a description of a source code, in which a skip in reading occurs, is compiled based on a correction of the error, thereby resolving the error, a compilation is performed with performing no correction, thereby enabling an occurrence of an error due to a dual definition to be suppressed.

Based on the detection of an error and the suppression of an occurrence of a new error, described in the present embodiments, it is possible to suppress an increase in the number of times of compilations performed until a source code causing no error to occur in a compilation is created. In addition, in addition to the point of view of an increase in the number of times of compilations, form the point of view of the number of errors that occur, it is possible to achieve the reduction of the number of occurrences of errors. Accordingly, it is possible to achieve the improvements of a workload of a source code creator and a processing cost of a computer to execute a compilation.

About Example of Modification

The embodiments described above are included in embodiments of the present disclosure, and definitions may be altered.

In the present embodiments, a case where, regarding creation of a source code and a compilation, the COBOL is used as a programming language is exemplified, for example. In this regard, however, depending on a used programming language or compiler, pieces of information stored in the correction information storage unit 324 and the conversion candidate data storage unit 325 may be arbitrarily changed, thereby being able to be applied to creation of a source code, based on a programming language other than the COBOL.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

receiving a source code;
performing an analysis that analyzes the received source code;
when at least one error is detected in the analysis, referring to error correction information including recovery information indicating a correction method for an error;
generating a new source code in which a first portion of the source code corresponding to the at least one error is corrected based on the recovery information corresponding to the at least one error;
determining whether or not a skip flab indicating that the analysis is not performed in a second portion of the source code in accordance with an occurrence of the at least one error is included in the error correction information of the at least one error;
performing the analysis on the new source code to generate an analyzed new source code when determining that the skip flag is included in the error correction information of the at least one error;
outputting the new source code when determining that the skip flag is not included in the error correction information of the at least one error; and
generating an object program by converting one of the analyzed new source code and the new source code.

2. The non-transitory computer-readable storage medium according to claim 1, wherein the analysis is analysis processing at a time of a source code compiling.

3. The non-transitory computer-readable storage medium according to claim 1, wherein the performing the analysis includes generating an error list that includes identification information and location information for each of the at least one error.

4. The non-transitory computer-readable storage medium according to claim 3, wherein the error information includes the identification information and check item information indicating a check content of a description of the source code for the error.

5. The non-transitory computer-readable storage medium according to claim 4, wherein the error correction information further includes priority information, the priority information being associated with the identification information of the error when the recovery information of the error includes multiple procedures.

6. The non-transitory computer-readable storage medium according to claim 4, wherein the process further includes searching the error correction information based on the identification information of the at least one error.

7. The non-transitory computer-readable storage medium according to claim 4, wherein the error list includes content information that identifies a content of the error; and wherein the process further comprises: performing no correction on the received source code corresponding to a first error included in the at least one error when a lexical element included corresponding to the first error in the source code is described so as to precede a portion of the source code corresponding to the first error and when a content of the first error indicated by the content information includes that the specified error is caused by lack of definition in a portion of the received source code on which the first analysis was previously performed.

8. The non-transitory computer-readable storage medium according to claim 7, wherein the process further comprises: when a content of a second error indicated by the content information includes that a different description that is different from a plurality of lexical elements, which is identified by lexical information and for which a meaning within the received source code is defined, is included in a description corresponding to the second error, specifying a lexical element, included in the lexical information, having a correlation with the different description, the correlation being greater than or equal to a predetermined reference value; and correcting the second error by replacing the different description with the specified lexical element in the generated new source code.

9. The non-transitory computer-readable storage medium according to claim 8, wherein lexical information is information held by a compiler to perform the analysis according to a specific rule.

10. The non-transitory computer-readable storage medium according to claim 3, wherein the error correction information includes skip range information indicating a range of the source code in which the analysis is not performed when the skip flag is set.

11. The non-transitory computer-readable storage medium according to claim 1, wherein the process further includes displaying, on a display, a description in which a difference between the new source code and the received source code before a correction is recognizable.

12. A correction support method executed by a computer, the correction support method comprising:
receiving a source code;
performing an analysis that analyzes the received source code;
when at least one error is detected in the analysis, referring to error correction information including recovery information indicating a correction method for an error;
generating a new source code in which a first portion of the source code corresponding to the at least one error is corrected based on the recovery information corresponding to the at least one error;
determining whether or not a skip flag indicating that the analysis is not performed in a second portion of the source code in accordance with an occurrence of the at least one error is included in the error correction information of the at least one error;
performing the analysis on the new source code to generate an analyzed new source code when determining that the skip flag is included in the error correction information of the at least one error;
outputting the new source code when determining that the skip flag is not included in the error correction information of the at least one error; and
generating an object program by converting one of the analyzed new source code and the new source code.

13. The correction support method according to claim 12, wherein the performing the analysis includes generating an error list that includes identification information and location information for each of the at least one error.

14. The correction support method according to claim 13, wherein the error correction information includes the identification information and check item information indicating a check content of a description of the source code for the error.

15. The correction support method according to claim 14, wherein the error correction information further includes priority information, the priority information being associated with the identification information of the error when the recovery information of the error includes multiple procedures.

16. The correction support method according to claim 14, further comprising searching the error correction information based on the identification information of the at least one error.

17. A correction support device comprising:
a memory; and
a processor coupled to the memory and the processor configured to:
  receive a source code;
  perform an analysis that analyzes the received source code;
  when at least one error is detected in the analysis, refer to error correction information including recovery information indicating a correction method for an error;
  generate a new source code in which a first portion of the source code corresponding to the at least one error is corrected based on the recovery information corresponding to the at least one error;
  determine whether or not a skip flag indicating that the analysis is not performed in a second portion of the source code in accordance with an occurrence of the at least one error is included in the error correction information of the at least one error;
  perform the analysis on the new source code to generate an analyzed new source code when determining that the skip flag is included in the error correction information of the at least one error;
  output the new source code when determining that the skip flag is not included in the error correction information of the at least one error; and
  generate an object program by converting one of the analyzed new source code and the new source code.

18. The correction support device according to claim 17, wherein the analysis includes generating an error list that includes identification information and location information for each of the at least one error.

19. The correction support device according to claim 18, wherein the error correction information includes the identification information and check item information indicating a check content of a description of the source code for the error.

20. The correction support device according to claim 18, wherein the processor searches the error correction information within the memory based on the identification information of the at least one error.

* * * * *